May 26, 1942.   K. J. KLEIN   2,284,394
TOOL HOLDER
Filed July 16, 1941   2 Sheets-Sheet 1
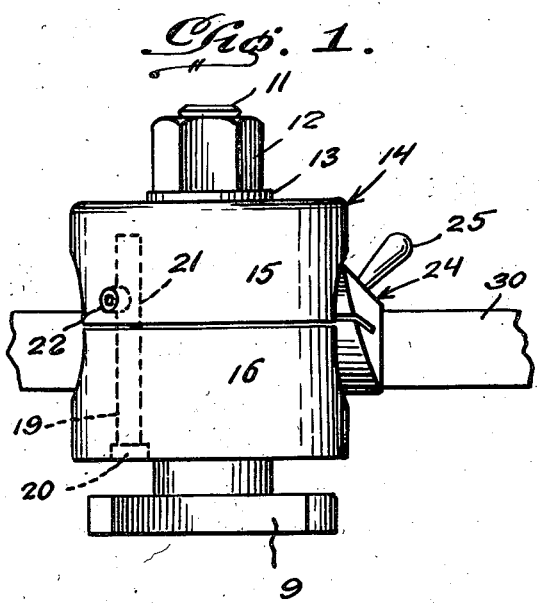
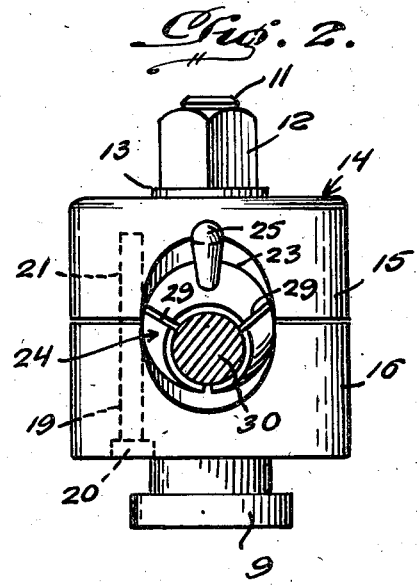
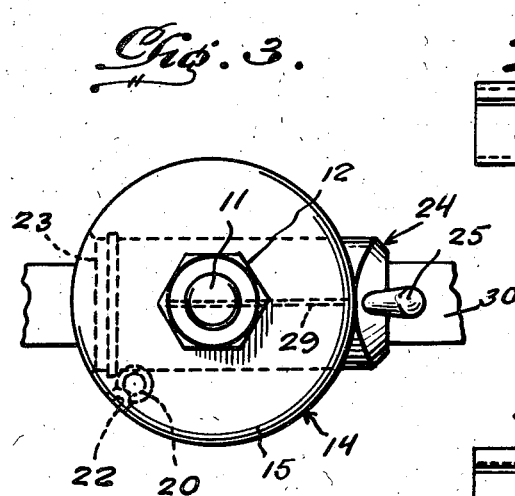
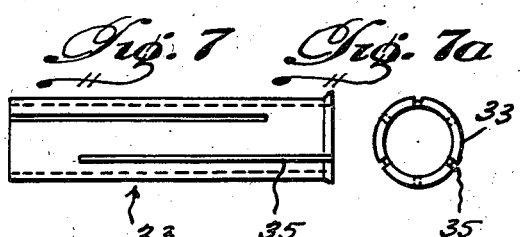
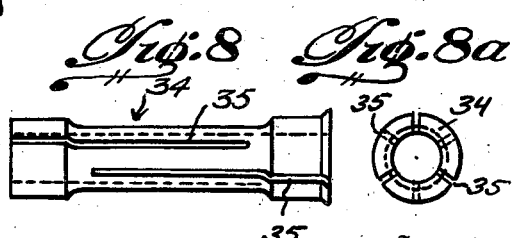
Inventor
Kenneth J. Klein,
By McMorrow & Berman
Attorneys May 26, 1942.  K. J. KLEIN  2,284,394
TOOL HOLDER
Filed July 16, 1941  2 Sheets-Sheet 2
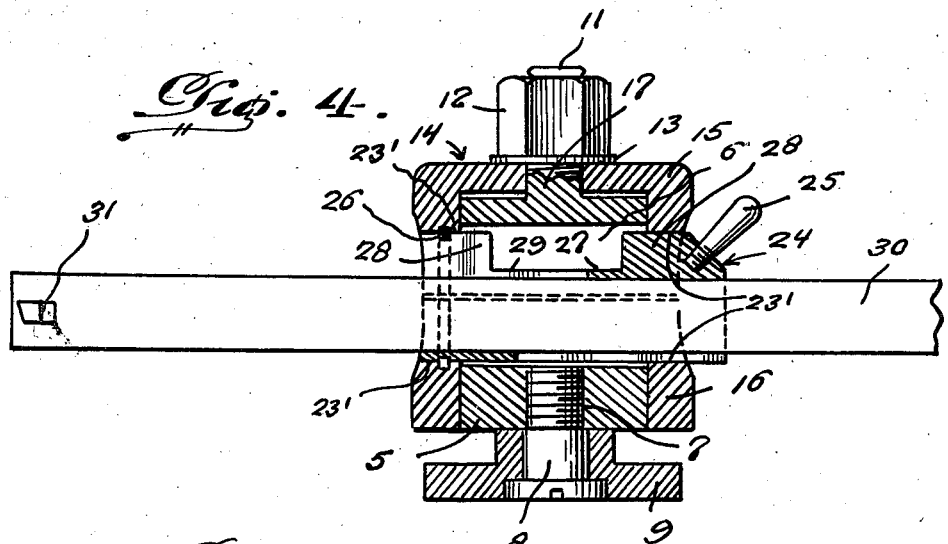
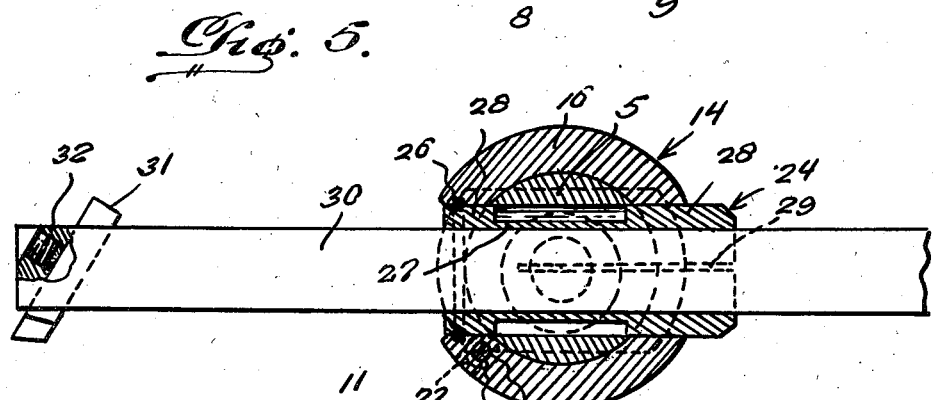
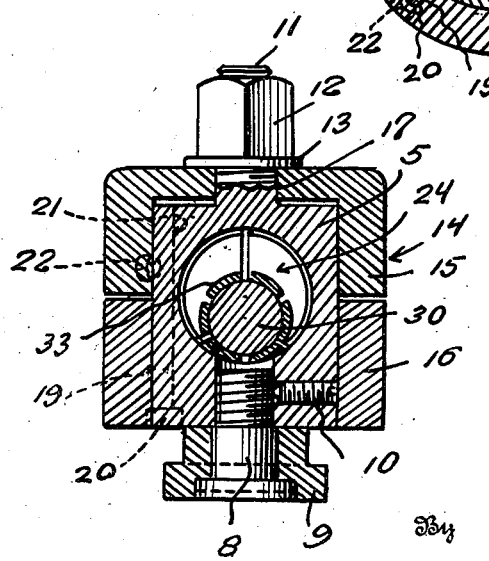
Inventor
Kenneth J. Klein,
By McMorrow & Berman
Attorneys Patented May 26, 1942

2,284,394

UNITED STATES PATENT OFFICE 2,284,394

TOOLHOLDER

Kenneth J. Klein, Erie, Pa.

Application July 16, 1941, Serial No. 402,672

5 Claims. (Cl. 82—36)

This invention relates to tool holders for lathes and similar devices and more particularly to a cutter bar mounting, and has for the primary object the provision of a device of this character which may be easily and quickly installed on a lathe or similar device and will provide an efficient clamp for the cutter or tool bar to readily secure the same against accidental displacement and to permit said bar to be conveniently raised or lowered or adjusted vertically with respect to the work as well as permitting adjustment of the bar longitudinally in either direction.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a side elevation illustrating a tool holder constructed in accordance with my invention.

Figure 2 is an end elevation, partly in section, illustrating the same.

Figure 3 is a top plan view illustrating the device.

Figure 4 is a vertical sectional view illustrating the device.

Figure 5 is a longitudinal sectional view illustrating the device.

Figure 6 is a transverse sectional view illustrating the device.

Figure 7 is a side elevation illustrating one of the adapter sleeves. Figure 7a is an end elevation, illustrating said adapter sleeve.

Figure 8 is a view similar to Figure 7 showing another adapter sleeve.

Figure 8a is an end elevation, illustrating the adapter sleeve shown in Figure 8.

Referring in detail to the drawings, the numeral 5 indicates the body of the device which has extending longitudinally therethrough an opening 6. The lower wall of the body 5 is provided with a screw threaded opening 7 to receive a bolt 8 for rotatably and detachably securing on the body an attaching head 9. This head is shaped to fit the ordinary type of slot found on a lathe for the mounting of a tool holder. A set screw 10 is carried by the body and is turned against the bolt 8 for locking the latter in the body.

Formed on the top wall of the body is an upstanding screw threaded stud 11 to receive a nut 12 and a wear washer 13.

The body 5 is received within a sectional casing 14 consisting primarily of upper and lower sections 15 and 16. The upper section 15 is provided with an opening 17 to permit the screw threaded stud 11 to extend therethrough so that the wear washer 13 may rest against the top face of the section 15 with the nut in engagement therewith. The lower section 16 is provided with an opening 19 to receive a headed pin 20, the head of which is disposed lowermost and countersunk in the opening. The pin extends into a socket 21 provided in the section 15 and is fixed therein by a set screw 22 engaging therewith and carried by the section 15. The purpose of the pin is to permit a limited relative movement of the sections 15 and 16 toward and from each other.

Opposite walls of the casing 14 are provided with openings 23 disposed opposite the ends of the opening 6 in the body. The walls of the openings 23 form bearing surfaces 23' for an eccentric 24 equipped at one end with a handle 25 located exteriorly of the casing to permit manual rotation of the eccentric within said casing.

A retainer ring 26 rotatably secures the eccentric within the casing and retains said eccentric against endwise movement.

The eccentric 24 is in the form of a sleeve 27 with end bearing portions 28 engageable with the walls of the openings 23. The sleeve portion 27 is provided with slots 29 that extend into the bearing portions 28 for the purpose of permitting the sleeve portion to be contracted for gripping a tool bar 30 which extends therethrough.

To bring about gripping of the sleeve portion 27 of the eccentric 24 on the tool bar 30, the nut 12 is adjusted on the stud 11. The turning of the nut 12 in one direction will bring about movement of the section 15 and 16 of the casing 14 toward each other contracting the eccentric to bring about effective gripping thereof on the tool bar which will prevent the latter from being moved endwise or longitudinally in either direction.

The tool bar 30 is of a conventional construction carrying the usual cutter 31 removably secured thereto, as shown at 32.

By rotating the eccentric the tool bar may be raised or lowered and after being thus adjusted it may be secured in its present position by tightening the nut 12 on the stud 11 securing the eccentric against rotation.

In order that smaller tool bars 30 may be employed in the holder, adapter sleeves 33 and 34 may be employed either of which is easily mountable within the eccentric 24 and each is of a type that contraction thereof may take place under the contraction of the eccentric 24. In order that either of the adapter sleeves may contract slots 35 are provided therein.

The head 9 being rotatable on the body 5 will permit this device to be readily adjusted to a desired angle on the lathe with the tool bar 30 paralleling the lathe bed.

From the foregoing description taken in connection with the accompanying drawings it will be seen that a very efficient mounting has been provided capable of withstanding excessive strain and may be easily and quickly mounted and demounted from a lathe or similar device.

Further it will be seen that this type of mounting will permit the tool bar to be easily adjusted vertically as well as longitudinally and will effectively secure the tool bar against accidental movement or displacement in any of its adjusted positions.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a tool bar mounting, a body having an opening to freely receive a tool bar for adjustment vertically and longitudinally, means for securing said body to a support, a sectional casing carried by said body and having openings matching the first-named opening, means for securing the sections of the casing for limited movement relative to each other, a contractible eccentric receiving the tool bar and rotatably received in the second named opening for the vertical adjustment of said tool bar with relation to the body, and means between the body and one section of the casing to bring about gripping of the eccentric for the contraction thereof on the bar.

2. In a tool bar mounting, a body having an opening to freely receive a tool bar for adjustment vertically and longitudinally, means for securing said body to a support, a sectional casing receiving said body and having openings aligning with the first named opening, means for adjustably connecting the sections of the casing and permitting said sections to have a limited movement relative to each other, a contractible sleeve eccentric journaled in the second-named openings and extending through the first-named opening and receiving the bar for the vertical adjustment of the bar with relation to the body, and an adjustable fastening means between one of the sections of the casing and the body for the contraction of the eccentric sleeve on the bar.

3. In a tool bar mounting, a body having an opening to freely receive a tool bar for adjustment vertically and longitudinally, means for securing said body to a support, a sectional casing receiving the body and having openings aligning with the first-named opening, a screw threaded stud on said body and extending through one of the sections of the casing, a contractible eccentric sleeve journaled in the second named openings and receiving the bar whereby the latter may be adjusted vertically with respect to the body, a nut threaded on said stud and engaging the casing for gripping and contracting the eccentric sleeve on the bar, and a connection between the sections of the casing.

4. In a tool bar mounting, a body having an opening to freely receive a tool bar for adjustment vertically and longitudinally, means for securing said body to a support, a sectional casing receiving the body and having openings aligning with the first-named opening, a screw threaded stud on said body and extending through one of the sections of the casing, a contractible eccentric sleeve journaled in the second named openings and receiving the bar whereby the latter may be adjusted vertically with respect to the body, a nut threaded on said stud and engaging the casing for gripping and contracting the eccentric sleeve on the bar, a pin loosely connected to one of the sections of the casing and fixed to the other section to permit said sections to have a limited movement relative to each other.

5. In a tool bar mounting, a body having an opening to freely receive a tool bar for adjustment vertically and longitudinally, means for securing said body to a support, a sectional casing receiving the body and having openings aligning with the first-named opening, a screw threaded stud on said body and extending through one of the sections of the casing, a contractible eccentric sleeve journaled in the second named openings and receiving the bar whereby the latter may be adjusted vertically with respect to the body, a nut threaded on said stud and engaging the casing for gripping and contracting the eccentric sleeve on the bar, a pin loosely connected to one of the sections of the casing and fixed to the other section to permit said sections to have a limited movement relative to each other, and a contractible adapter sleeve to receive the bar and fit within the eccentric sleeve.

KENNETH J. KLEIN.